US009656534B2

(12) United States Patent
Wade et al.

(10) Patent No.: US 9,656,534 B2
(45) Date of Patent: May 23, 2017

(54) VEHICLE DOOR CLOSURE CABIN PRESSURE RELIEF SYSTEM

(71) Applicant: FORD GLOBAL TECHNOLOGIES, LLC, Dearborn, MI (US)

(72) Inventors: David Arthur Wade, Plymouth, MI (US); Paul Elia, West Bloomfield, MI (US); James Antime Marleau, Canton, MI (US); Paul Repp, Plymouth, MI (US); Richard E. Newton, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 867 days.

(21) Appl. No.: 13/803,592

(22) Filed: Mar. 14, 2013

(65) Prior Publication Data
US 2014/0273786 A1 Sep. 18, 2014

(51) Int. Cl.
*B60H 1/24* (2006.01)
*B60H 1/00* (2006.01)

(52) U.S. Cl.
CPC ..... *B60H 1/00828* (2013.01); *B60H 1/00735* (2013.01)

(58) Field of Classification Search
CPC ............ B60H 1/00828; B60H 1/00835; B60H 1/00842; B60H 1/248
USPC ..................................................... 454/70, 75
See application file for complete search history.

(56) References Cited

U.S. PATENT DOCUMENTS

| 2,573,419 | A | * | 10/1951 | Emery ............................. 454/75 |
| 4,593,609 | A | | 6/1986 | Nagatomo et al. |
| 7,204,472 | B2 | | 4/2007 | Jones et al. |
| 8,029,343 | B2 | | 10/2011 | Major et al. |
| 2010/0099346 | A1 | * | 4/2010 | Browne et al. ................. 454/70 |
| 2010/0216384 | A1 | | 8/2010 | McCarthy et al. |
| 2012/0003907 | A1 | * | 1/2012 | Carlson et al. ................. 454/70 |
| 2013/0095738 | A1 | * | 4/2013 | Marleau .................. F24F 13/24 454/141 |

OTHER PUBLICATIONS

Ramie Abu-Zahra et al. "Vehicle Air Extractor Redesign", Publication Date: Dec. 12, 2007, pp. 1-50; Source: http://deepblue.lib.umich.edu/bitstream/2027.42/57948/1/me450f07project18_report.pdf.

\* cited by examiner

*Primary Examiner* — Steven B McAllister
*Assistant Examiner* — Ko-Wei Lin
(74) *Attorney, Agent, or Firm* — Jason C. Rogers; Brooks Kushman P.C.

(57) ABSTRACT

An active pressure relief system for a vehicle cabin in response to a cabin-door closure. An air-extractor may be configured to open when a cabin-door is opened, and remain open until the last of a number of cabin-doors are closed. The air-extractor allows for the increased pressure resulting from the cabin-door closure to be equalized with the external environment through the air-extractor. After the last of a number of cabin-doors are closed, the air-extractor closes to inhibit noise and external elements from entering the cabin through the air-extractor.

17 Claims, 2 Drawing Sheets

VEHICLE DOOR CLOSURE CABIN PRESSURE RELIEF SYSTEM

TECHNICAL FIELD

This disclosure relates to pressure relief systems for vehicle cabins and specifically to an active pressure relief valve that opens in response to cabin-doors being opened and closes in response to cabin-doors being closed.

BACKGROUND

Vehicles may use pressure relief valves, also known as air-extractors, to influence air flow from the vehicle cabin to enhance passenger comfort. As a climate control system takes in ambient air from outside the vehicle, air exhaustion through the pressure relief valves may be required to attain proper circulation and reduce cabin pressure build-up.
Passive pressure relief valves for venting pressure from an automotive cabin are known in the art. The pressure relief valves are typically a plastic housing with an elastomer flap that opens when the interior pressure is greater than the exterior pressure. The greater interior pressure forces the flap open and cabin air is exhausted through the valve until the pressure is equalized. Once pressure is equalized the flap closes under its own weight. Flaps typically rely on gravity to remain closed. This valve design is susceptible to noise and exterior elements entering the passenger compartment through the air-extractor when the vehicle is moving. To reduce the amount of noise and exterior elements from entering the cabin, the passive pressure relief valves are designed as small as possible which limits the rate at which the pressure relief valve may equalize pressure.

When cabin-doors are closed, a sudden pressure rise may be created. Cabin-door closure builds air pressure within the cabin rapidly resulting in high closing efforts and potential discomfort to passengers. Current pressure relief valves may not be able to relieve the cabin pressure build-up fast enough. If current pressure relief valves are able to relieve the cabin pressure fast enough, then the size of the pressure relief valve may allow for more noise and exterior elements to enter the cabin than desired. Either way, the current pressure relief valves require a tradeoff that may not be desirable to the drivers or passengers of the vehicle.

SUMMARY

One aspect of this disclosure is directed to a vehicle cabin pressure-relief system. The system utilizes an active air-extractor, a door-position sensor, and a controller that in combination reduce air pressure build-up in a cabin resulting from a cabin-door closure. The air-extractor is in fluid communication with a vehicle cabin. The door-position sensor is used for indicating a closed and/or a non-closed position of a cabin-door. The controller is in communication with the door-position sensor and is programmed to open the air-extractor based upon the cabin-door being in the non-closed position.

The system may use an actuator connected to the air-extractor to open louvers within the air-extractor. The air-extractor may spring-biased louvers in a closed position in which the actuator overcomes a spring force to open the air-extractor. In this case, the actuator is energized to maintain the louvers in the open position, and when the actuator is no longer energized, the spring force returns the air-extractor to the closed position. Conversely, the air-extractor may not be spring-biased and the actuator is used to both open and close the air-extractor, requiring no energy to maintain the louvers in the open position. The air-extractor may restrict pressure differential to occur between the cabin and the exterior when the air-extractor is in the closed position.

Another aspect of this disclosure is directed to a vehicle cabin pressure relief system for reducing cabin pressure build-up during the closure of a cabin-door. This system has a controller programmed to maintain a cabin-valve in an open position based on a cabin-door being open. The controller is programmed to maintain the valve in an open position allowing any increase in air pressure within the cabin caused by the closure of the cabin-door to be equalized with an external environment through the valve. The controller may also be programmed to close the cabin-valve.

This system may be used on a vehicle with a cabin having a single cabin-door or a number of cabin-doors. In the case where the vehicle cabin has a number of doors, each cabin-door may have its own cabin-valve, or a number of cabin-doors may share a cabin-valve. In the case where cabin-doors share a cabin-valve, the controller may be programmed to open the cabin-valve when any of the cabin-doors are opened, and maintain the cabin-valve in an open position until the last of the cabin-doors associated with that cabin-valve are closed.

A further aspect of this disclosure is a method of controlling pressure increase in a vehicle cabin caused by a closure of a cabin-door. The method includes the opening of a cabin-valve in response to an opening of a cabin-door. The method includes the maintaining of the cabin-valve in an open position while a cabin-door is open. Maintaining the cabin-valve in an open position allows increased cabin pressure caused by a cabin-door closure to pass through the cabin-valve. The method includes the closing of the cabin-valve in response to a closing of a cabin-door. Closing the cabin-valve inhibits exterior elements and noise from entering the cabin through the cabin-valve.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
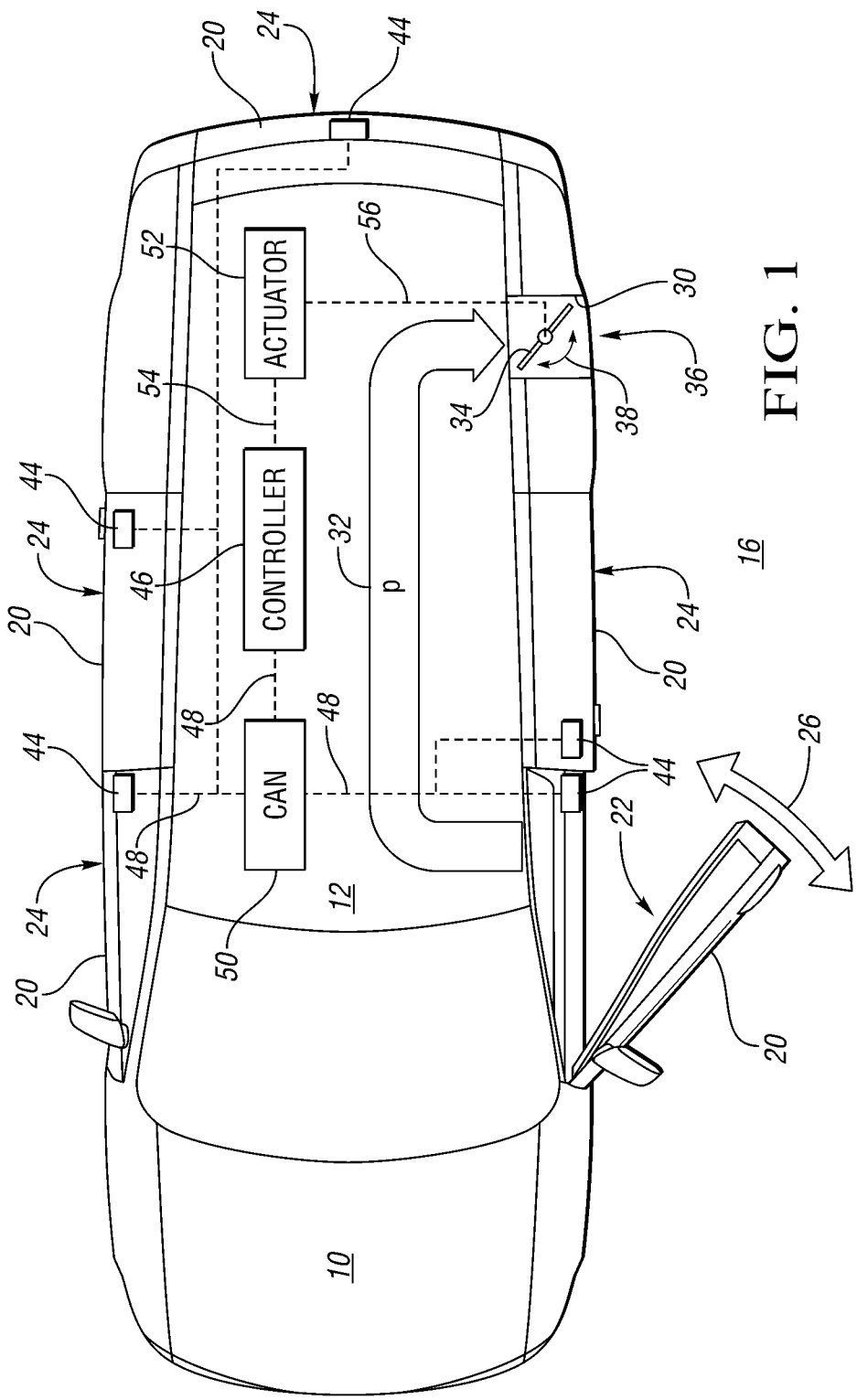
FIG. 1 is a diagrammatic top view of a vehicle having a cabin, an open door, and an open pressure relief valve in response to the open door.

FIG. 1 shows a vehicle 10 with a cabin 12 having an internal air pressure p. The vehicle 10 is surrounded by an external environment 16 that has an external air pressure (undesignated). The vehicle 10 has a cabin-door 20 that provides access to the cabin 12. A cabin-door 20, also known simply as a door 20, is a movable structure of a vehicle 10 that allows access to a cabin 12. The cabin-door 20, as used in this disclosure, is any movable structure of a vehicle 10 that when being closed may increase the internal pressure p within the cabin 12. A cabin-door 20 may be a door hinged at the front-facing edge, a door hinged at its trailing edge, a door hinged at the top edge such as a gull-wing door or hatchback, a door hinged at the bottom edge such as a tailgate or liftgate, a door that rotates vertically upward such as a scissor door, a door that sits on top of a vehicle and closes downward such as a canopy door or hatch, or a sliding door which does not hinge, rather the door slides along a side of a vehicle on a track and comes inward towards the cabin at the end of the track. A cabin-door 20 may also be a window or access panel that when closing increases the internal air pressure p within the cabin 12.

Cabin-door 20 is shown in a non-closed position 22. A non-closed position 22 is any position from fully open to slightly ajar in which the cabin-door 20 is not fully closed and sealed with the cabin 12. A cabin-door 20 in a non-closed position 22 allows the internal air pressure p of the cabin to equalize with the external air pressure of the external environment 16 through the cabin-door opening. The vehicle 10 is also shown having a number of cabin-doors 20 in a closed position 24. A cabin-door 20 in a closed position 24 is fully closed and sealed with the cabin 12 such that it does not allow the internal air pressure p of the cabin to equalize with the external air pressure of the external environment 16. Vehicle 10 is shown as an automobile with multiple cabin-doors 20, but any vehicle 10 with a cabin 12 or multiple cabins 12 each having single or multiple cabin-doors 20 could be used.

Cabin-door 20 may swing further open or further closed as indicated by arrow 26. When the cabin-door 20 swings closed it may push air from the external environment 16 into the cabin 12 and increase the internal air pressure p. An increased internal air pressure p may result in greater closing efforts being needed to fully close the cabin-door 20. Improved vehicle body sealing (not shown) has also contributed to requiring increased closing efforts. A spike in internal air pressure p may result in discomfort to a driver or passengers.

Vehicle 10 is therefore equipped with an air-extractor 30 in fluid communication with the cabin 12 and the external environment 16 for venting increased air pressure p caused by a closing door back into the external environment 16. The increased internal air pressure p caused by the closing of door 20 may exit the cabin 12 through the air-extractor 30, as shown by arrow 32. The air-extractor 30 may also be referred to as a pressure relief valve 30, a cabin-valve 30, or a closing effort exhauster 30. The air-extractor 30 is shown with a louver 34 in an open or non-closed position 36. The louver 34 may be further opened and closed as indicated by arrow 38. The air-extractor 30 may also be placed in a closed position 40 (see FIG. 2) in which air pressure may not be equalized between the cabin 12 and the external environment 16.

Vehicle 10 has a number of door-position sensors 44 located at each cabin-door 20. The door-position sensor 44 is used to indicate whether its respective cabin-door 20 is in a closed position 24 or a non-closed position 22. A controller 46 is in communication with the door-position sensors 44, as indicated by dashed lines 48. Controller 46 may be a door control module, for example. In FIG. 1, the controller 46 is shown being in communication with door-position sensors 44 through an internal communications network 50. The internal communications network 50 may be a Controller Area Network, or CAN, which is a standard network designed to allow microcontrollers and devices to communicate with each other within a vehicle without a host computer. Although the door-position sensors 44 are shown connected to the CAN 50, the door-position sensors 44 may be connected directly to the controller 46. A single controller 46 may be used to process the data from all door-position sensors 44, or each door-position sensor may be connected to an independent controller 46.

The controller 46 obtains data regarding a cabin-door's 20 position. The controller 46 is programmed to open an air-extractor 30 based upon a cabin-door 20 being in a non-closed position 22. The controller 46 may be programmed to maintain the air-extractor 30 in an open or non-closed position 36 based on a cabin-door 20 remaining in a non-closed position 22. Maintaining the air-extractor 30 open while a cabin-door 20 is open allows for any increase in air pressure p within cabin 12 caused by the closure of the cabin-door 20 to be equalized with the external environment 16 through the air-extractor 30. The controller 46 may be programmed to close the air-extractor 30 based on the cabin-door 20 being in a closed position 24. An air-extractor 30 in a closed position 40 (see FIG. 2) inhibits exterior elements and noise from the external environment 16 from entering the cabin 12 through the air-extractor 30.

A single air-extractor 30 may be used in conjunction with a number of cabin-doors 20, or each cabin-door 20, or a sub-set of cabin-doors 20, may have their own air-extractor 30. In the case where each cabin-door 20 has its own air-extractor 30, the controller 46 would be programmed to open and close the air-extractor 30 based on the position of it respective cabin-door 20. In the case where a single air-extractor 30 is shared by a number of cabin-doors 20, the controller 46 may be programmed to open the air-extractor 30 based on any of the number of cabin-door being positioned in a non-closed position 22, maintain the air-extractor 30 in an open position 36 while any of the number of cabin-doors 20 remain open, and close the air-extractor 30 based upon the last of the number of cabin-doors to be positioned in a closed position 24. In other words, the air-extractor 30 opens when the first cabin-door 20 is opened and remains open until the last cabin-door 20 is closed.

The controller 46 may be programmed to actuate an actuator 52 to open the air-extractor. The controller is in communication with the actuator 52 as shown by dashed line 54. The actuator 52 is connected to the air-extractor 30 as shown by dashed line 56. The controller 46 may engage the actuator 52 and open the air-extractor 30 based on a cabin-door 20 being in a non-closed position 22.

Figure 2:
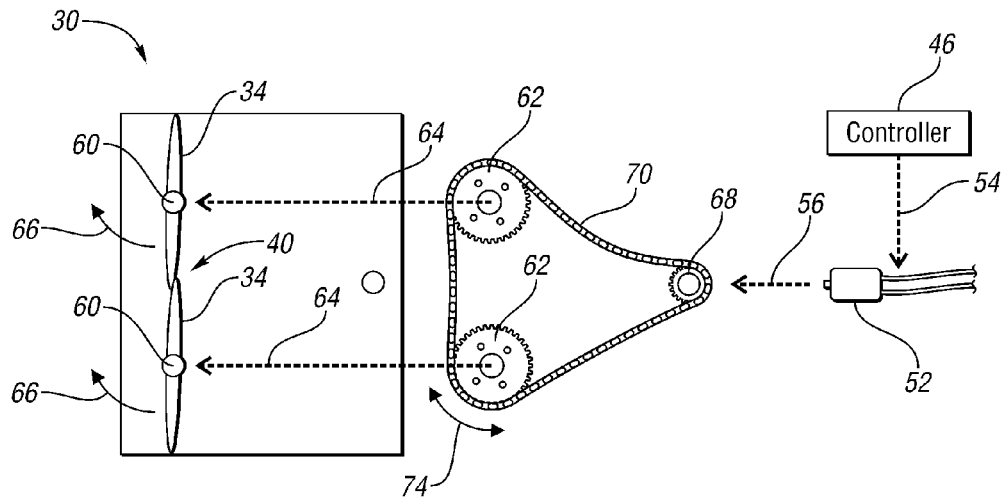
FIG. 2 is a diagrammatic view of a pressure relief valve in a closed position and accompanying hardware.

FIG. 2 shows an air-extractor 30 having two louvers 34 in a closed position 40. Although two louvers 34 are shown, a single louver 34 or a number of louvers 34 may be used. Air-extractor 30 is closed by overlapping louvers 34, although other valve designs may be used. Louvers 34 may have a seal (not shown) added to the louver blade, or may be made from an elastomeric material to aid in the closing off of air movement and/or pressure through the air-extractor 30. When the air-extractor 30 is in the closed position 40, the air-extractor 30 may inhibit exterior elements and noise from passing through the air-extractor 30. Examples of exterior elements include dust, water, insects, and rodents.

The air-extractor 30 may have louvers 34 each having a pivot shaft 60 to which the louvers 34 may rotate. Each pivot shaft 60 may be connected to a louver gear 62 as indicated by connection lines 64. The louver gears 62 may be used to rotate the louvers 34 open, as indicated by arrows 66. The louver gears 62 may be connected to a pinion gear 68 by a chain or belt 70. The actuator 52, shown here as a motor, may be connected to the pinion gear 68 as indicated by dashed line 56. A controller 46 may energize the motor 52, as indicated by dashed arrow 54, and rotate a spindle on the motor connected to the pinion gear 68. The pinion gear 68 may drive the belt 70 and turn the louver gears 62 as indicated by rotation arrow 74. The rotation of the louver gears 62 rotates the pivot shafts 60 opening the louvers 34 as indicated by arrows 66.

In this configuration, the air-extractor 30 may remain open with no additional energy or input from the controller 46. The controller 46 may then reverse polarity and energize motor 52 to rotate the louvers 34 in the opposite direction to close the air-extractor 30.

Figure 3:
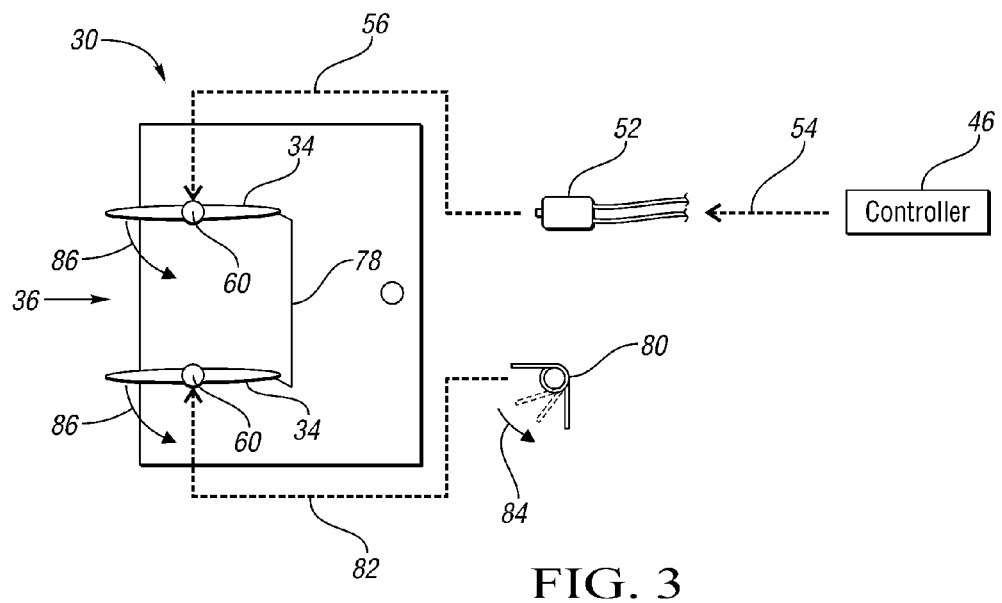
FIG. 3 is a diagrammatic view of a pressure relief valve in an open position and accompanying hardware.

FIG. 3 shows an air-extractor 30 having two louvers 34 in an open or non-closed position 36. When the air-extractor 30 is in an open position 36, pressurized air inside the vehicle 10 may pass through the air-extractor 30. The air-extractor 30 may have louvers 34 each having a pivot shaft 60. The louvers 34 may be mechanically linked, as indicated by linkage 78, to move in unison with each other. The motor 52 may be directly connected to a pivot shaft as indicated by dashed line 56.

The air-extractor 30 may be a normally-closed valve, meaning that the valve remains closed until acted upon by an outside force. The louvers 34 may be held in a closed position 40 by a torsion spring 80. Torsion spring 80 biases the air-extractor 30 into a spring-biased closed position 40. A single torsion spring 80 may be connected to one louver 34, as indicated by connection line 82, or multiple torsion springs 80 may be used for each louver 34 or a number of louvers 34. The torsion spring 80 when coiled from its normal position exerts a spring force in the opposite direction as indicated by arrow 84. Spring force 84 rotates the louvers 34 towards the closed position 40 as indicated by rotation arrows 86.

The controller 46 may energize a motor 52 and rotate a top louver 34 to the open position 36. The linkage 78 between the top and bottom louvers 34 moves the bottom louver 34 into the open position simultaneously. The torsion spring 80 connected to the bottom louver 34 counteracts the motor rotation, thus the motor 52 overcomes the spring force to open the air-extractor 30. The motor 52 remains energized to maintain the air-extractor 30 in the open position 36. When the controller 46 cuts power to the motor 52, the spring force of the torsion spring 80 overcomes the frictional forces of the motor 52 and returns the louvers 34 to the closed position 40.

Systems as described above provide a method of controlling pressure increase in a vehicle cabin caused by a closure of a cabin-door. The method includes opening a cabin-valve in response to an opening of a cabin-door. The method may also include maintaining the cabin-valve in an open position in response to any one of a number of cabin-doors remaining open. An open cabin-valve will allow any increased cabin pressure caused by a cabin-door closure to pass through the open cabin-valve. The method also includes closing the cabin-valve in response to a closing of a cabin-door. In the case where a single cabin-valve is shared by a number of cabin-doors, the method may include only closing of the cabin-valve in response to the last of a number of cabin-doors being closed, such that the possible increase in pressure caused by the last cabin-door to be closed may still be exhausted through the cabin-valve. The method may also include maintaining the cabin-valve closed when the cabin-doors are closed inhibiting exterior elements and noise from entering the cabin through the cabin-valve.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle cabin pressure-relief system comprising:
   an air-extractor, including a louver and gear to rotate the louver, and an actuator mechanically linked to the louver via a pinion gear and belt, fluidly connected to a cabin;
   a spring to bias the air-extractor;
   a position sensor for a door; and
   a controller in communication with the position sensor and programmed to open the air-extractor, via the actuator, when the door is in a non-closed position.

2. The system of claim 1 further comprising an actuator connected to and capable of opening the air-extractor, wherein the controller is programmed to actuate the actuator to open the air-extractor based upon the door being in the non-closed position.

3. The system of claim 2 wherein the controller actuates the actuator to overcome a spring force to open the air-extractor, and the spring force returns the air-extractor to a closed position when the actuator is no longer actuated by the controller.

4. The system of claim 1 further comprising an actuator connected to and capable of closing the air-extractor, wherein the controller is programmed to actuate the actuator to close the air-extractor based upon the door being in the closed position.

5. The system of claim 1 wherein the cabin has a number of doors and each door has an air-extractor.

6. A vehicle cabin pressure relief system comprising:
   a valve, including a louver and gear to rotate the louver, and an actuator mechanically linked to the louver via a pinion gear and belt to drive the gear, fluidly connected to a cabin, biased to a closed position by a spring; and
   a controller programmed to maintain the valve in an open position, via the actuator, based on a door being open such that an increase in air pressure within the cabin caused by a closure of the door is equalized with an external environment through the valve.

7. The system of claim 6 further comprising a number of doors and the controller maintains the valve in an open position when any one of the number of doors remains open.

8. The system of claim 7 wherein the controller is further programmed to close the valve based upon a last of the number of doors being closed.

9. The system of claim 8 wherein the valve is closed by a spring.

10. The system of claim 8 wherein the valve is closed by an actuator.

11. The system of claim 8 wherein the valve allows an air pressure differential between the cabin and the external environment through the valve when the valve is in a closed position.

12. The system of claim 6 wherein the controller obtains an indication of the door being open from an internal communications network.

13. The system of claim 6 wherein the controller is a door control module.

14. The system of claim 6 wherein the spring is a torsion spring, the controller energizes a motor to overcome a force of the torsion spring to open the valve, the motor remains energized by the controller to maintain the valve open, and the torsion spring overcomes a friction of the motor when the motor is no longer energized to close the valve.

15. A method of controlling pressure increase in a vehicle cabin caused by a closure of a cabin-door comprising:
    biasing a cabin-valve including a louver and gear to rotate the louver, and an actuator mechanically linked to the louver via a pinion gear and belt to drive the gear that fluidly connects the vehicle cabin to an external environment to a closed position using a spring;
    opening, via the gear, a cabin-valve in response to an opening of a cabin-door;
    maintaining the cabin-valve, via the actuator, in an open position while a cabin-door is open allowing increased cabin pressure caused by a cabin-door closure to pass through the cabin-valve; and
    allowing, via the spring, the cabin-valve to close in response to a closing of a cabin-door.

16. The method of claim 15 wherein the vehicle cabin has a number of cabin-doors, and the method further comprising maintaining the cabin-valve in an open position in response to any of the number of cabin-doors being open, and closing the cabin-valve in response to a last of the number of cabin-doors being closed.

17. The method of claim 15 further comprising closing the cabin-valve and inhibiting exterior elements and noise from an exterior of the cabin from entering the cabin through the cabin-valve.

* * * * *